Sept. 23, 1958   KAZUO ISHIKAWA   2,853,637
FRACTIONAL DIRECT CURRENT TORQUE MOTOR
Filed Dec. 12, 1956   2 Sheets-Sheet 1

United States Patent Office 2,853,637
Patented Sept. 23, 1958

2,853,637

FRACTIONAL DIRECT CURRENT TORQUE MOTOR

Kazuo Ishikawa, Tokyo, Japan

Application December 12, 1956, Serial No. 627,816

4 Claims. (Cl. 310—40)

This invention relates to the improvement in low power constant torque motors described in the specification of U. S. Patent No. 2,779,882, and particularly to motors which are used to supply the motive power of a clock driven by a low voltage, direct current source such as a dry cell battery. In such a clock motor, very small output torque of a motor is sufficient to drive the clock properly, and it is important to reduce current consumption as much as possible to prolong the life of the battery. For such essential purposes the motor of the original invention as described in the above-mentioned U. S. patent must use coil wire of very small diameter, further increasing the resistance of the motor by increasing the number of coil turns to reduce current. However, such a design involves a comparative increase of cost and also difficulties in production.

In contrast, a motor provided according to the instant invention is very effective as a clock motor without the accompanying difficulties mentioned above. According to this invention, the same size wire is used, but the resistance of the motor is increased three times, reducing the current to ⅓ of that of the motor of the original invention, while the torque of motor is only halved, the sum of the ampere turns being reduced by fifty percent. This means that the efficiency is advantageously higher than with the motor of original invention.

Figure 1:
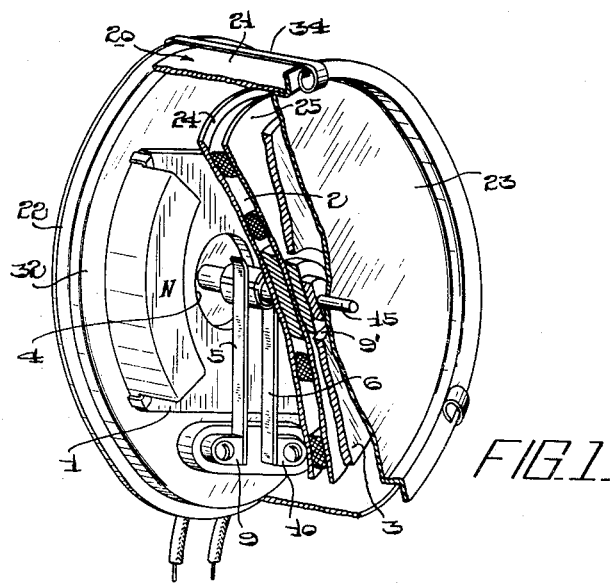
Figure 3:
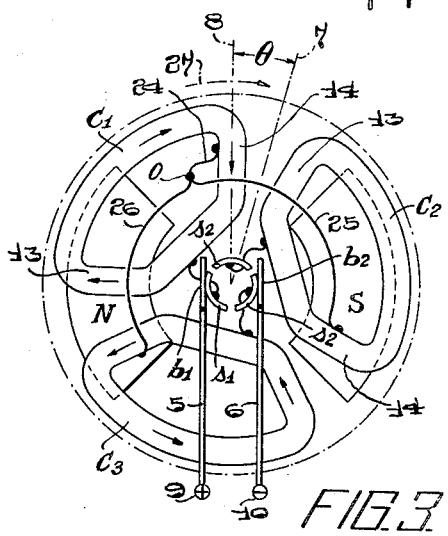
Figure 2:
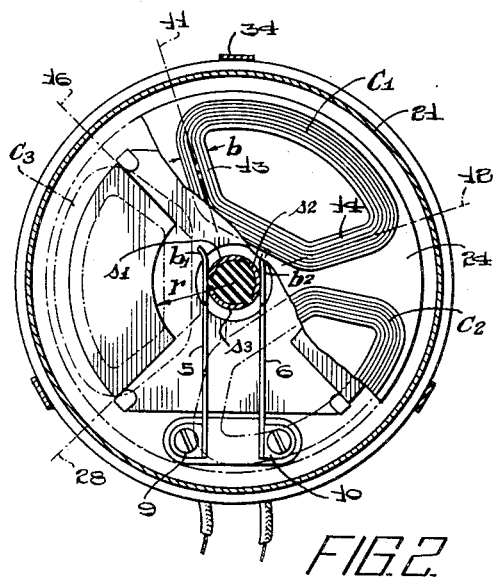
Figure 3A:
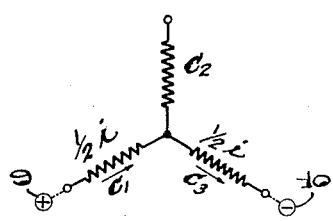
Figure 4:
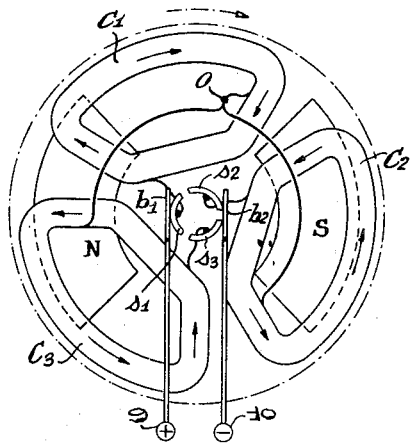
Figure 5:
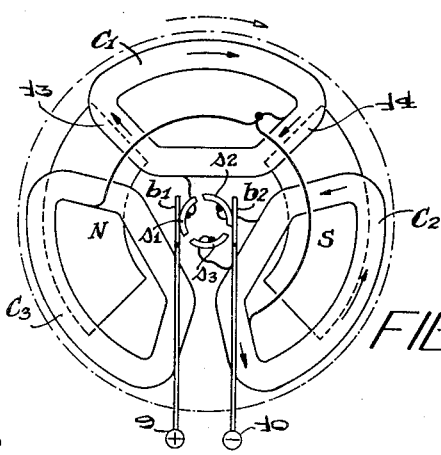
Figure 4A:
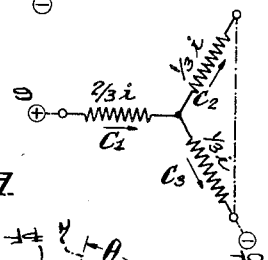
Figure 5A:
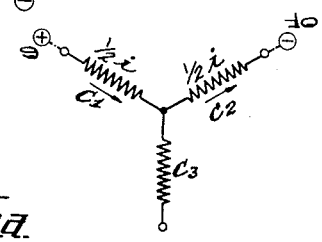
Figure 7:
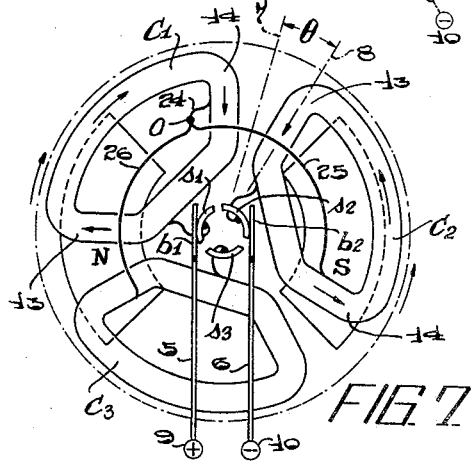
Figure 6:
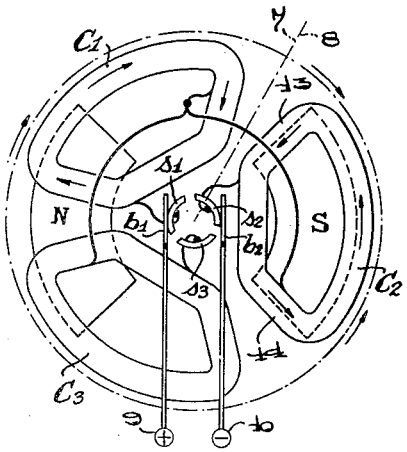
Figure 7A:
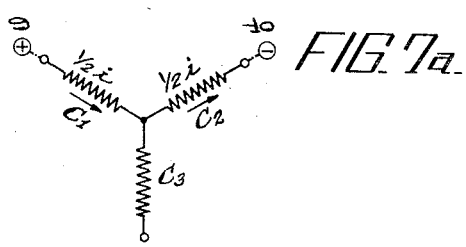

For a better understanding of the invention, reference will next be made to the accompanying drawing in which:

Fig. 1 is a perspective view of a constant torque direct current motor, partly broken away, according to the present invention, Fig. 2 is a sectional plan view of the motor of Fig. 1, Fig. 3 illustrates diagrammatically the relationship of the currents flowing in the armature coils in a first position of the armature relative to the pole faces of a magnet, Fig. 3a is a diagram showing current distribution in the coils as shown in Fig. 3, Fig. 4 illustrates diagrammatically the relationship of the current flowing in the armature coils in a second position of the armature when advanced from the first position, Fig. 4a is a diagram showing current distribution in the coils shown in Fig. 4, Fig. 5 illustrates diagrammatically the relationship of electric currents and coils, when one of the coils overlaps the opposite ends of a pole face of a magnet employed in an embodiment of the invention, Fig. 5a is a diagram showing current distribution in the coils shown in Fig. 5, Figs. 6 and 7 show diagrammatically the relationship of electric currents and coils in the commutator and brushes of a motor in which the invention is not applied, and Fig. 7a is a diagram showing the current distribution in the coils shown in Fig. 7.

Referring to Figures 1 and 2, a casing 20 comprises end plates 22 and 23 which are fixed by clips 34 to the ends of a cylinder 21. A field magnet 1 consisting of a permanent magnet, or an electro-magnet and a magnetic ring plate 3 are fixed to the end plates 22 and 23 respectively. In the space between the field magnet 1 and the plate 3 rotates an armature 2. The armature 2 comprises three coreless fan-shaped coils $C_1$, $C_2$ and $C_3$ which are held between two thin discs 24 and 25. The coils $C_1$, $C_2$ and $C_3$ are spaced at an angular distance of 20°. The pole faces of the north and south poles of the field magnet 1, facing toward the plates 3, are formed in the shape of a fan having an inside diameter of $(r)$. The radial lines 16 and 23, which extend between the two sides of the pole face and the center of the shaft of the armature 2, subtend an angle of 90° at the armature axis. The angle formed between center lines 11 and 12 passing through the straight parts 13 and 14 of each coil which interlink with the magnetic flux in the air gap, also subtend an angle of 90° at the armature axis. The straight effective part of each coil has a width $(b)$ as shown in Figure 2. The shaft 15 fixed to the armature 2 passes through apertures 4 and 9' of the magnet 1 and the ring plate 3, and is supported by the end plates 22 and 23. Three segments $s_1$, $s_2$ and $s_3$ which are insulated from one another and also from the shaft 15, are provided thereon to form a commutator. Brushes $b_1$ and $b_2$ are connected respectively by means of spring members 5 and 6 to terminals 9 and 10.

As shown in Figure 3, the armature coils $C_1$, $C_2$ and $C_3$ are connected respectively at their one end with the commutator segments $s_1$, $s_2$ and $s_3$ and they are connected all together at the other ends with one point 0 by means of wires 24, 25 and 26. The relative position of the commutator to the armature is set at a suitable angle away from the armature coil to which the corresponding commutator segment is connected, in order to avoid offsetting actions between the torques produced in the armature coils by maintaining proper relationship between the magnetic field and the current directions in the effective parts of the armature coils. In other words, it is necessary to make the angle $\theta$ between the chain lines 7 and 8 to be within the range of from $$\left(\frac{b}{2r}\right) \text{ to } \left(\frac{\pi}{3} - \frac{b}{2r}\right)$$

the chain line 7 being a line passing through the center of the commutator axis and the middle of the space between the effective parts 14 and 13 of the coils $C_1$ and $C_2$, and the latter chain line 8 being a line passing through the center of the segment $s_2$ and the commutator axis. In place of shifting the position of the commutator in relation to the armature coil, a pair of brushes may be displaced with respect to the commutator to effect the same relation as mentioned above.

The operation of this constant torque motor will be understood by reference to Figures 3 to 5a. Figures 3 and 3a illustrate the current distribution in the armature coils of this motor which turns in the direction of an arrow 27. The brushes $b_1$ and $b_2$ which are respectively in contact with the segments $s_1$ and $s_2$ of the commutator are connected with the positive and negative terminals 9 and 10 of a suitable direct current electric source through the conductors 5 and 6 respectively. The coil $C_1$ is connected at its one end with the commutator segment $s_1$ and at the other end with the coil $C_3$ in series through the wires 24 and 26, and coil $C_3$ is connected at its other end with the commutator segment $s_3$. Neither of the brushes $b_1$ and $b_2$, however, is in contact with the commutator segment $s_2$ connected with the coil $C_2$, thus the coil $C_2$ is electrically independent of the series circuit of the coils $C_1$ and $C_3$. Accordingly, the current $\frac{1}{2}i$ will flow in the series coils $C_1$ and $C_3$, but not in the coil $C_2$, wherein $i$ is a current value when the terminal voltage is directly applied to each coil of the armature. As each coil has the same number of turns $n$, a formula for the sum of the ampere turns will be as follows:

$$\tfrac{1}{2}in + \tfrac{1}{2}in = in \qquad (1)$$

wherein the first item in the Formula 1 designates the number of ampere turns of the coil $C_1$ and the second item designates that of the coil $C_3$ as shown in Figure 3a.

Figure 4 shows the current distribution in the armature coils at a second position slightly advanced from the first position, wherein the brush $b_1$ is in contact with the commutator segment $s_1$ and the brush $b_2$ with both the commutator segments $s_2$ and $s_3$ at the same time. Thus, the coil $C_1$ is connected in series with the parallel circuit of two coils $C_2$ and $C_3$ as illustrated in Figure 4a. Therefore, the formula for the sum of the ampere turns will be as follows:

$$\tfrac{2}{3}in + \tfrac{1}{3}i \times 2n = \tfrac{4}{3}in \qquad (2)$$

wherein the first item designates the number of ampere turns of the coil $C_1$ and the second item designates the sum of that of the coils $C_2$ and $C_3$ in parallel. Comparing the total ampere turns of $\tfrac{4}{3}in$ in the Formula 2 to that as shown in the Formula 1, the former is larger than the latter by $\tfrac{1}{3}in$. However, as the simultaneous contact period of the brush $b_2$ with both the segments $s_2$ and $s_3$ is only an instant, the increase of the torque of the motor due to this increment of the ampere turn or $\tfrac{1}{4}ni$ is negligible.

If the armature is stopped in such a manner that the brushes are in contact with all the commutator segments as shown in Figure 4, there will be an advantage obtained in that the motor can be readily started by the increment of ampere turns as noted.

Further, referring to Figures 5 and 5a, it will be noted that a half of the left part 13 of the coil $C_1$ overlaps the pole face N and a half of the right part overlaps the pole face S. Thus, when the lefthand coil $C_1$ partially leaves the pole face N, the righthand coil 14 will commence to overlap the pole face S to the same extent.

The brushes $b_1$ and $b_2$ are respectively connected with the commutator segments $s_1$ and $s_2$, so the coils $C_1$ and $C_2$ are connected in series while the coil $C_3$ does not make an electric circuit with said coils in series as shown in Figure 5a. Accordingly, the sum of the ampere turns will be indicated by a formula as follows:

$$\tfrac{1}{2}i \times \tfrac{1}{2}n + \tfrac{1}{2}i \times \tfrac{1}{2}n + \tfrac{1}{2}in = in \qquad (3)$$

wherein the first item designates the number of ampere turns of the lefthand part 13 of the coil $C_1$, the second item designates that of the righthand part of the coil $C_1$ and the third item designates that of the coil $C_2$.

Figures 6, 7 and 7a are diagrams showing two kinds of motors which are not embodiments of the present invention. When the chain lines 7 and 8 coincide with each other and both the left and right effective parts partly overlap the pole face S as shown in Figure 6, the direction of the magnetic flux remains the same, but the current directions in the parts 13 and 14 are opposite to each other and consequently the torque of the motor is decreased.

Further, when the angle $\theta$ between the lines 7 and 8 is shifted, as shown in Figure 7, in the reverse direction in contradistinction to Figure 3, the radial direction of the current in the part 13 of the coil $C_1$ overlapping the pole face N is similar to that in the part 14 of the coil $C_2$ overlapping the pole face S, and thus the corresponding torques cancel each other out.

What is claimed is:

1. A constant-torque direct-current motor comprising rotor and stator members, said rotor defining an axis of rotation, one of said members including an even number $n$ of pole pieces symmetrically spaced and each subtending a predetermined angle at said axis, the other of said members including $n+1$ coils symmetrically spaced and each subtending said angle at the axis, means for supporting said rotor and stator in operative relationship, a commutator including segments corresponding to said coils and respectively coupled to said coils, said coils being coupled in star arrangement, said segments being angularly displaced from said coils by a determinable angle to maintain flux linkage between said rotor and stator substantially constant, and means for applying electrical energy to said segments.

2. A motor as claimed in claim 1 comprising three fan-shaped coils and two fan-shaped pole pieces.

3. A motor as claimed in claim 1 wherein the coils include effective portions $b$ which are magnetically linkable with said pole pieces and said pole pieces define inside radii $r$ relative to said axis, said determinable angle having a magnitude with the range of $b/2r$ to $\pi/3 - b/2r$.

4. A motor as claimed in claim 1 wherein said rotor includes said coils and said stator includes said pole pieces.

References Cited in the file of this patent

UNITED STATES PATENTS

| 573,080 | Duncan | Dec. 15, 1896 |
| 944,061 | Varley | Dec. 21, 1909 |
| 2,066,343 | Gillen | Jan. 5, 1937 |
| 2,202,051 | Gillen | May 28, 1940 |

FOREIGN PATENTS

| 302,497 | Great Britain | Dec. 20, 1928 |